(12) United States Patent
Clewes et al.

(10) Patent No.: US 8,062,097 B2
(45) Date of Patent: Nov. 22, 2011

(54) GRINDING SURFACES OF WORKPIECES

(75) Inventors: Stuart Clewes, Keighley (GB);
Granville Grayston, Keighley (GB)

(73) Assignee: Cinetic Landis Limited (GB)

( * ) Notice: Subject to any disclaimer, the term of this patent is extended or adjusted under 35 U.S.C. 154(b) by 380 days.

(21) Appl. No.: 12/517,407

(22) PCT Filed: Dec. 18, 2007

(86) PCT No.: PCT/GB2007/004843
§ 371 (c)(1),
(2), (4) Date: Jun. 3, 2009

(87) PCT Pub. No.: WO2008/075020
PCT Pub. Date: Jun. 26, 2008

(65) Prior Publication Data
US 2010/0081365 A1    Apr. 1, 2010

(30) Foreign Application Priority Data
Dec. 21, 2006   (GB) .................................. 0625515.2

(51) Int. Cl.
*B24B 19/08* (2006.01)
(52) U.S. Cl. .................. 451/49; 451/57; 451/59
(58) Field of Classification Search .............. 451/49, 451/57, 59, 51, 342, 548
See application file for complete search history.

(56) References Cited

U.S. PATENT DOCUMENTS

| 2,726,493 A | 12/1955 | Young |
| 3,290,102 A | 12/1966 | Eriksson |
| 4,709,508 A | 12/1987 | Junker |
| 5,766,059 A | 6/1998 | Imai |

FOREIGN PATENT DOCUMENTS

| BE | 840687 A1 | 8/1976 |
| DE | 2727576 B1 | 7/1978 |
| EP | 0321972 A2 | 6/1989 |
| EP | 0521383 A1 | 1/1993 |
| JP | 2004/257290 A | 9/2004 |
| WO | WO-2005/068099 A2 | 7/2005 |
| WO | WO-2006/055335 A2 | 5/2006 |

OTHER PUBLICATIONS

Search Report for GB0625515.2, dated Jul. 5, 2007.
Further Search Report for GB0625515.2, dated Mar. 11, 2011.

*Primary Examiner* — Dung Van Nguyen
(74) *Attorney, Agent, or Firm* — Barnes & Thornburg LLP

(57) ABSTRACT

A method of grinding a workpiece with a grinding wheel is provided wherein the shape of the wheel is distorted in a predetermined manner during grinding by changing the speed of rotation of the wheel. This deformation of the wheel during grinding is employed to impart a desired shape to the surface of the workpiece. A grinding wheel is also provided which is asymmetric in side view to adapt it for use in accordance with the method.

8 Claims, 4 Drawing Sheets

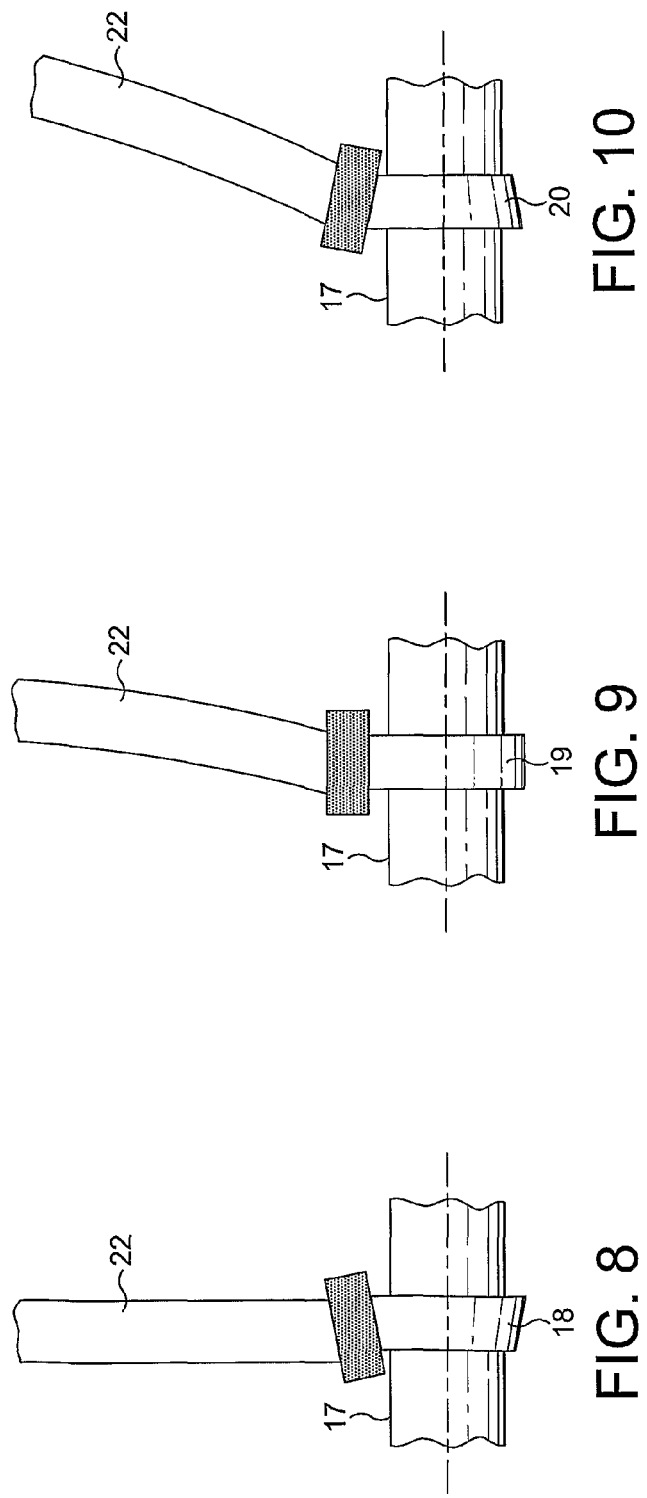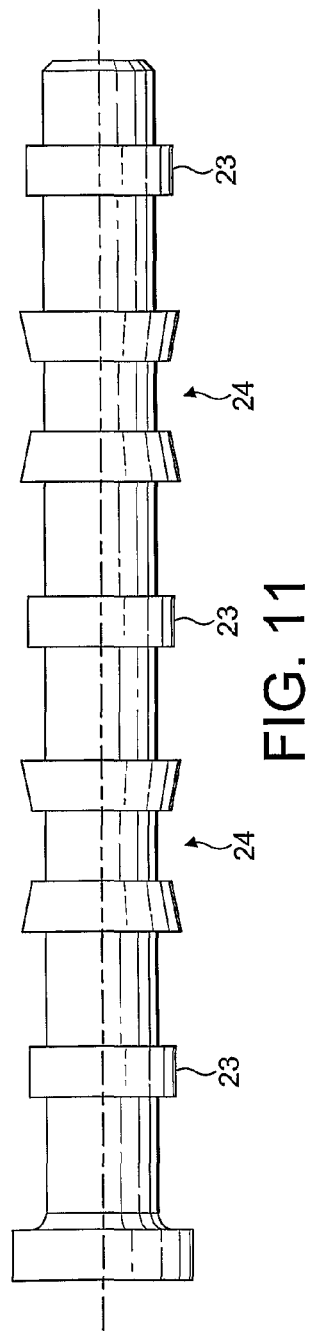

GRINDING SURFACES OF WORKPIECES

FIELD OF THE INVENTION

This invention relates to grinding surfaces of workpieces and is concerned with imparting a particular desired shape to the workpiece. In particular, the invention relates to a method of grinding a workpiece by a rotatable grinding wheel and to a grinding wheel for use in this method.

BACKGROUND TO THE INVENTION

Many plain cylindrical bearings such as those used for main bearings and crankpins for crankshafts require non-parallel profiles on the finished shaft. Such profiles are usually produced by plunge grinding with the reverse image of the desired profile dressed onto the periphery of the grinding wheel.

The recent introduction and application of Cubic Boron Nitride (CBN) grinding wheels to the bearing grinding process has led to the development of multi-plunge grinding techniques and diagonal or vector grinding as described in British Patent Specification No. 2413978. The newer grinding methods have made non-parallel sided cylindrical bearing components difficult, if not impossible, to produce. This invention addresses such difficulties, demonstrating a capability to grind non-parallel shapes, in particular barrel forms, whilst retaining the advantages of vector and multi-plunge grinding.

SUMMARY OF THE INVENTION

According to one aspect of the invention there is provided a method of grinding a workpiece by a rotatable grinding wheel, the method comprising rotating the wheel at a first speed during grinding of the workpiece, and rotating the wheel at a second speed during grinding of the workpiece so that the shape of the wheel is distorted in a predetermined manner during grinding at the second speed relative to its shape during grinding at the first speed to impart a desired shape to at least part of the workpiece.

Preferably, the distortion of the grinding wheel is such as to give the grinding wheel a dished shape, in comparison with a substantially planar shape of the undistorted grinding wheel.

In a preferred method the distortion is based on the inherent characteristics of the grinding wheel. The inherent characteristics may include the physical dimensions, physical shape and material of the grinding wheel, together with its modulus of elasticity.

The wheel may comprise a generally circular cutting disc and a central hub, and the inherent characteristics of physical dimensions may include the extent of asymmetry in the hub of the wheel.

The wheel may be a cubic boron nitride (CBN) wheel, or an aluminium oxide wheel.

The magnitude of wheel distortion may be predicted by deriving a relationship between the rotational speed of the grinding wheel and the distortion of the outer periphery of the wheel, and using the relationship to impart a desired distortion to the wheel in order to grind a desired profile on a workpiece. The relationship may be developed empirically, for example by measuring wheel periphery distortion at differing rotational speeds, or by a mathematical computation using parameters such as the physical extent of asymmetry of the wheel and properties of the material from which the wheel is made.

According to another aspect of the invention there is provided a grinding wheel for carrying out the method of said one aspect of the invention, the wheel being asymmetric in side view. This asymmetry may be imparted to the wheel by virtue of the wheel having a different profile or shape on respective sides of the wheel.

BRIEF DESCRIPTION OF THE DRAWINGS

The invention will now be further described, by way of example, with reference to the accompanying drawings, in which:

FIGS. 8, 9 and 10 show how the rotational speed of a grinding wheel can be varied to alter the angle of grind, and FIG. 11 illustrates a camshaft with parallel journals and lobes with tapers in opposite directions, ground by means of the method illustrated in FIGS. 8 to 10.

DETAILED DESCRIPTION OF THE DRAWINGS

Figure 3:
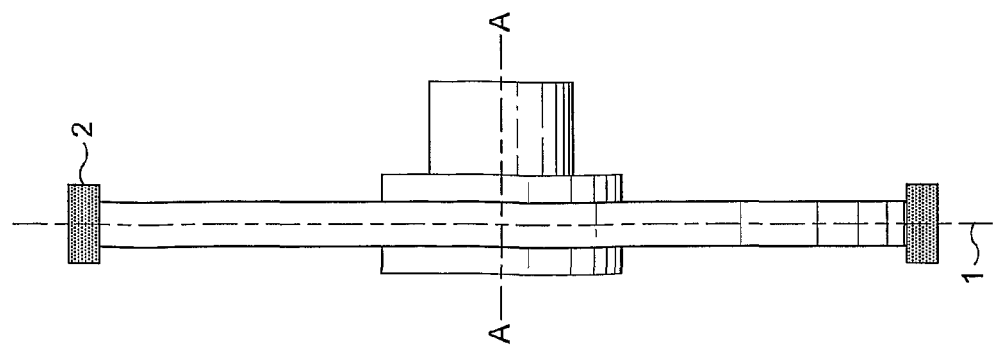
FIG. 3 illustrates how the grinding wheel of FIG. 2 can become distorted in use, the distorted shape being shown in broken lines.
Figure 2:
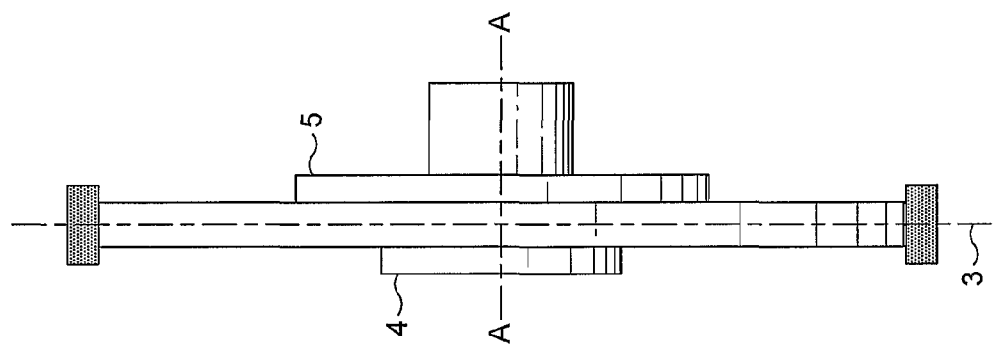
FIG. 2 is a side view of an asymmetrical grinding wheel.
Figure 1:
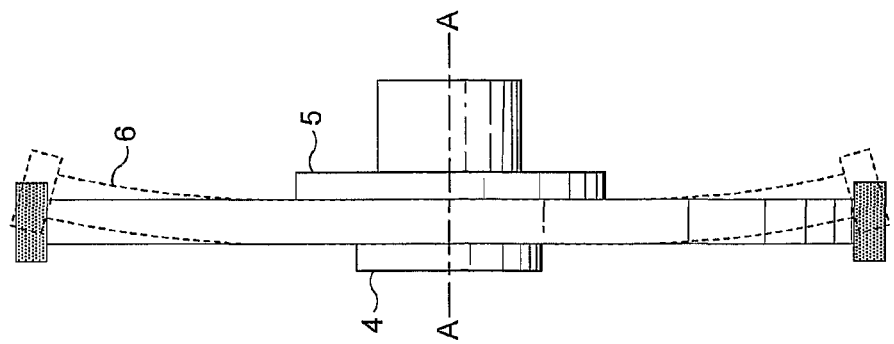
FIG. 1 is a side view of a symmetrical grinding wheel.

It is usual to design grinding wheels which, ignoring the drive shaft, are symmetrical about the centre line 1 in side view, as illustrated in FIG. 1. Such a wheel is circularly symmetric about its rotational axis A-A and has an outer periphery 2 formed with a grinding layer. Such a wheel may exhibit some distortion in use, which can be put to useful effect by recourse to the invention, but FIG. 2 illustrates a grinding wheel which is deliberately asymmetric about the centre line 3 in side view, by virtue of having circular shoulders 4, 5 of differing sizes on respective sides of the wheel. The effect of this imbalance is to cause the wheel to become distorted when it is rotated, as illustrated in broken lines at 6 in FIG. 3. Moreover, this distortion varies with the rotational speed of the wheel, and this distortion can be predicted over an operational speed range of the wheel. It has been found that changes in the peripheral speed of the wheel of less than 10 metres per second produce useful changes in wheel shape, and in the invention these changes are put to beneficial effect by appropriate choice of the physical size, shape and material of the grinding wheel, and also by appropriate selection of the rotational speed of the wheel during a grinding operation. The rotational speed is varied during grinding in order to vary the wheel distortion in a required predetermined manner in order to impart a required profile on a workpiece.

For a particular grinding wheel, a relationship between rotational speed and wheel distortion is derived and this relationship is used to impart a desired distortion to the wheel in order to grind a desired profile on a rotating workpiece. The relationship between wheel distortion and rotational speed can be derived empirically (e.g. by measuring peripheral wheel distortion at different rotational speeds, or by computation, using the physical parameters of the wheel).

Figure 4:
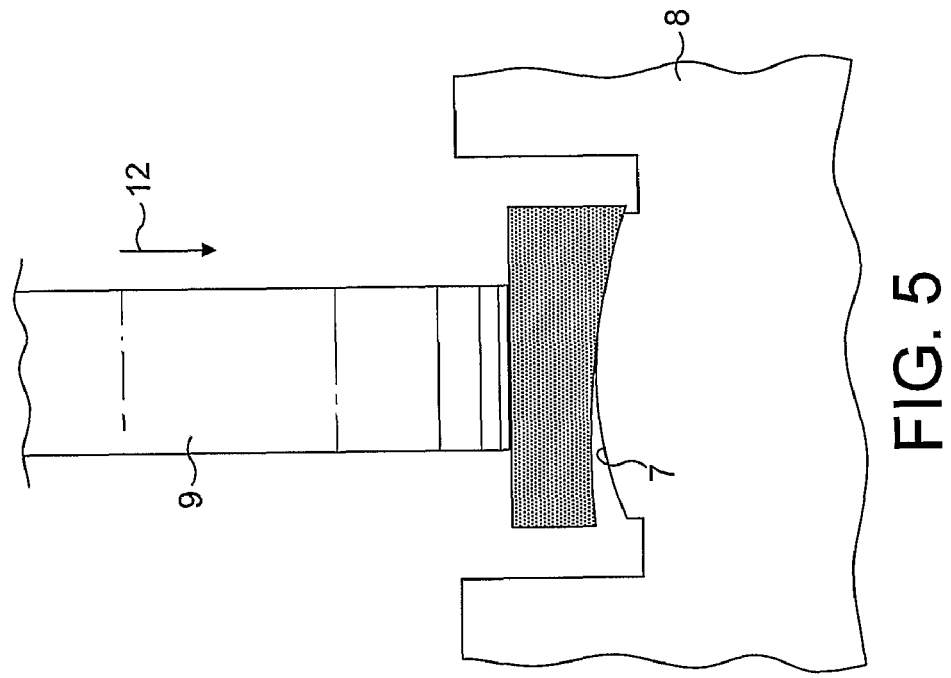
FIGS. 4 and 5 illustrate two successive steps in a plunge grinding operation according to the invention.
Figure 5:
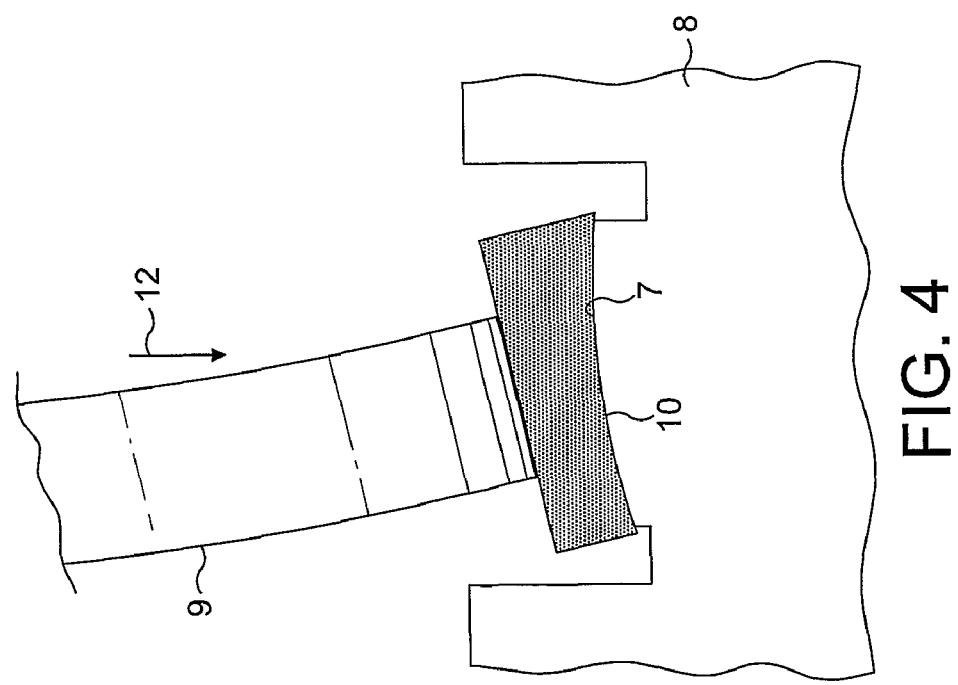

FIGS. 4 and 5 show a barrelled profile 7 being imparted to a rotating workpiece 8 by a two-stage grinding operation, using a grinding wheel 9 onto the periphery of which at least half the barrelled profile has been dressed (reference 10). In the first, stage, the first half of the profile 7 is ground by plunge grinding, as indicated by the arrow 12 in FIG. 4. Sufficient stock (i.e. workpiece material) remains for the second stage to be carried out and for the merging or blending of the two halves of the profile. The second stage of the profile is again achieved by plunge grinding, as indicated by the arrow 12 in FIG. 5, but the rotational speed of the wheel differs from the rotational speed used in the first stage, so that there is a different angle of wheel presentation, resulting in completion of the merging or overlap of the two halves of the barrelled profile 7.

Figure 7:
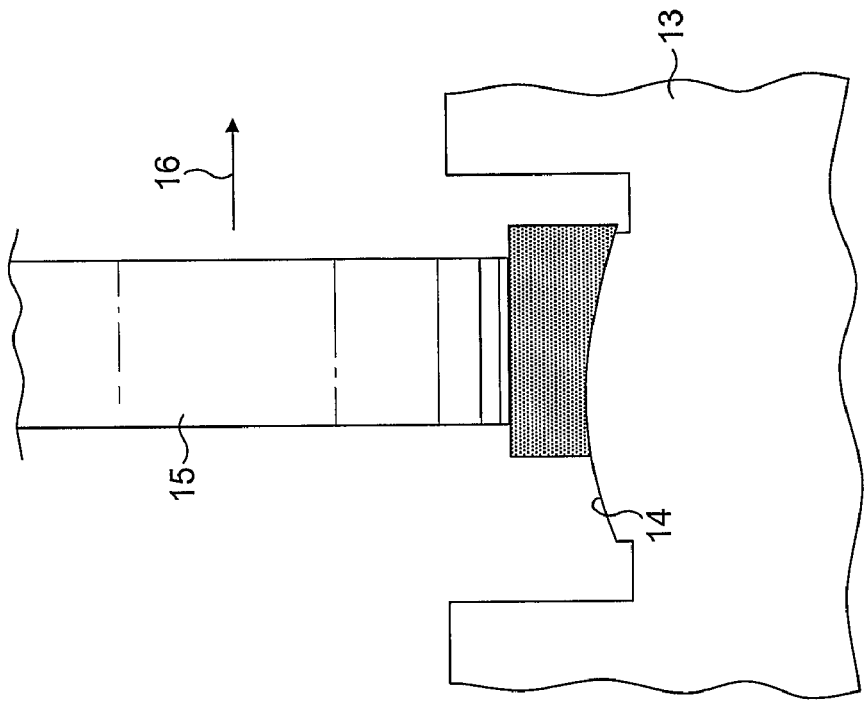
FIGS. 6 and 7 illustrate two successive stages in a grinding operation where the grinding wheel undergoes a lateral or traversing movement with respect to the workpiece in conjunction with a speed change.
Figure 6:
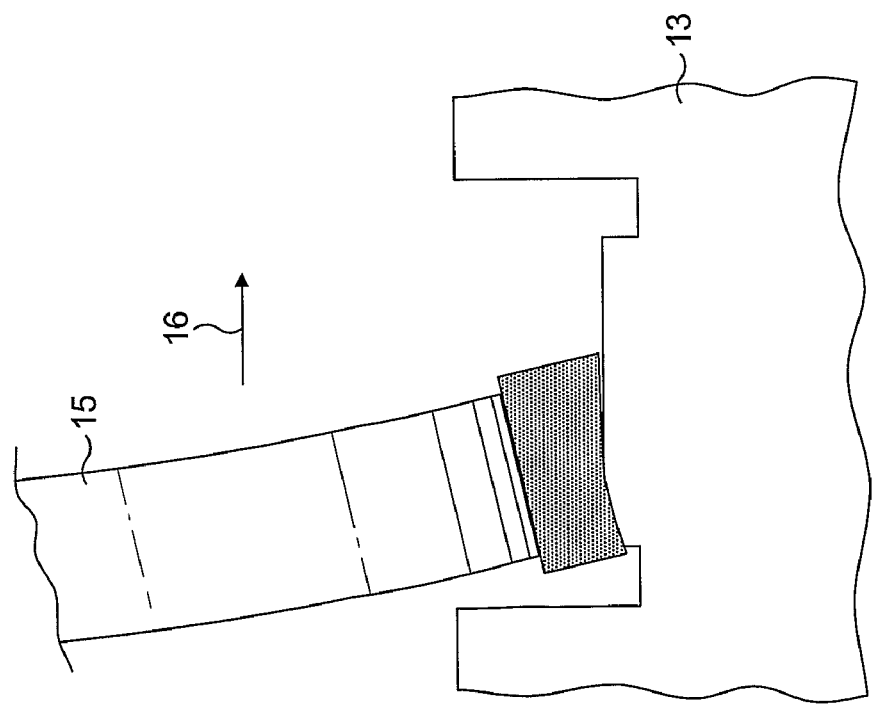

In the method illustrated in FIGS. 6 and 7, the workpiece 13 has ground thereon a barrelled profile 14 with a width exceeding the width of the grinding wheel 15. The rotating grinding wheel 15 undergoes a controlled traversing movement with respect to the workpiece 13 as indicated by the arrows 16, and the rotational speed of the wheel 15 is controlled, and varied as appropriate, throughout the grinding operation so that the wheel presents the correct angle to the workpiece 13 in order to impart to the latter the desired barrelled profile 14.

FIGS. 8 to 10 show how a shaft 17 is formed with tapered lobes 18 and 20 ground to a desired configuration which can be a taper in either direction (FIGS. 8 and 10) or parallel lobes or journals 19 (FIG. 9), by varying the rotational speed of the grinding wheel 22 so as to alter the distortion of the wheel in a predetermined fashion. FIG. 11 illustrates the resulting shaft 17 with parallel lobes or journals 23 and pairs of opposed frusto-conical taper lobes 24.

What is claimed is:

1. A method of grinding a workpiece by a rotatable grinding wheel, the method comprising rotating the wheel at a first speed during grinding of the workpiece, and rotating the wheel at a second speed during grinding of the workpiece, so that the shape of the wheel is distorted in a predetermined manner during grinding at the second speed relative to its shape during grinding at the first speed to impart a desired shape to at least part of the workpiece.

2. A method according to claim 1, wherein the distortion is such as to give a dished shape to the grinding wheel, in comparison with a generally planar shape for the undistorted wheel.

3. A method according to claim 1, wherein the prediction of distortion is based on the inherent characteristics of the grinding wheel.

4. A method according to claim 3, wherein the inherent characteristics include the physical dimensions, physical shape and material of the grinding wheel.

5. A method according to claim 4, wherein the wheel comprises a circular cutting disc and a central hub and the inherent characteristics of physical dimensions include asymmetry in the hub of the wheel.

6. A method according to claim 1, comprising deriving a relationship between rotational speed of the wheel and distortion of the wheel and using the relationship to impart a desired distortion to the wheel in order to grind a desired profile on a workpiece.

7. A method according to claim 1, wherein the wheel is a cubic boron nitride (CBN) wheel or an aluminium oxide wheel.

8. A method according to claim 1, wherein the desired shape is a barrel shape or a frusto-conical taper.

* * * * *